US010784743B2

(12) United States Patent
Ortiz et al.

(10) Patent No.: US 10,784,743 B2
(45) Date of Patent: Sep. 22, 2020

(54) HOUSING INCLUDING SNAP-FIT CONNECTION BETWEEN HOUSING COMPONENTS

(71) Applicants: Robert Bosch Mexico Sistemas Automotrices S.A. de C.V., Toluca (MX); Robert Bosch GmbH, Stuttgart (DE)

(72) Inventors: Luis Angel Ramirez Ortiz, Toluca (MX); Pablo Daniel Molina Cardozo, Toluca (MX); Alex Martin, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 16/103,249

(22) Filed: Aug. 14, 2018

(65) Prior Publication Data
US 2020/0059131 A1 Feb. 20, 2020

(51) Int. Cl.
*H02K 7/116* (2006.01)
*B60N 2/22* (2006.01)
*B60N 2/02* (2006.01)

(52) U.S. Cl.
CPC .......... *H02K 7/116* (2013.01); *B60N 2/0296* (2013.01); *B60N 2/2213* (2013.01); *B60N 2002/0236* (2013.01)

(58) Field of Classification Search
CPC ............... B60N 2/0296; B60N 2/2213; B60N 2002/0236; F16H 57/02; F16H 2057/0325
See application file for complete search history.

(56) References Cited

U.S. PATENT DOCUMENTS

| 5,260,532 A * | 11/1993 | Tinder ..................... H01H 9/04 200/292 |
| 5,577,799 A | 11/1996 | Dangel |
| 6,232,687 B1 | 5/2001 | Hollenbeck et al. |
| 8,397,461 B2 | 3/2013 | Browning et al. |
| 9,676,297 B2 | 6/2017 | Peniche et al. |
| 10,400,881 B1 * | 9/2019 | Ramirez Ortiz ..... B60N 2/0232 |
| 2014/0000399 A1 * | 1/2014 | Inoue .................... F16H 57/023 74/412 R |

* cited by examiner

*Primary Examiner* — Vicky A Johnson
(74) *Attorney, Agent, or Firm* — Kelly McGlashen; Maginot, Moore & Beck LLC (57) ABSTRACT

A vehicle seat actuator includes an electric motor and a gear set that connects the drive motor to the seat and transmits the output of the motor to the vehicle seat. The drive motor and gear set are each disposed in an individual, dedicated housing component. The individual housing components are then assembled together to provide the actuator. The housing components are maintained in the assembled configuration using snap fit mechanical fasteners. Each snap-fit fastener includes a receiving portion provided on one housing component and a retaining portion provided on the other housing component. The receiving portion may be a blind hole formed in the drive motor housing that is partially obstructed by an elastic member, while the retaining component is a latch that protrudes from an outer surface of the gear housing and forms a snap-fit engagement with the elastic member.

17 Claims, 4 Drawing Sheets

HOUSING INCLUDING SNAP-FIT CONNECTION BETWEEN HOUSING COMPONENTS

BACKGROUND

Actuators such as those used to adjust seat position within a vehicle may include an electric motor and a gear set. The gear set connects the drive motor to the vehicle seat, and transmits the output, of the motor to the vehicle seat. The drive motor and gear set may be fabricated separately and disposed in individual housing components. The individual housing components are then assembled together to provide the actuator. The housing components are maintained in the assembled configuration using mechanical fasteners such as screws. However, using screws to secure housing elements together may increase the number of parts that form the assembly and increase manufacturing steps and complexity. Increased number of parts and manufacturing complexity results in an increased actuator cost.

A need exists for an actuator housing that has fasteners that securely join the housing components, while reducing the number of parts that form the actuator assembly and reducing manufacturing complexity.

SUMMARY

In some aspects, a fastener is configured to join a first housing portion to a second housing portion. The fastener includes a receiving portion and a retaining portion that is received in, and engages with, the receiving portion. The retaining portion includes a latch that protrudes from one end of one of the first housing portion and the second housing portion. The latch includes an arm and a hook disposed on an end of the arm. The other of the first housing portion and the second housing portion includes an outward facing surface, the outward facing surface having a hole formed therein. In addition, the other of the first housing portion and the second housing portion includes an elastic member disposed in the hole so as to at least partially obstruct the hole. The receiving portion comprises the hole and the elastic member. When the first housing portion is assembled with the second housing portion, the latch is disposed in the opening and the hook forms a snap-fit engagement with a first edge portion of the elastic member in such a way that the arm is prevented from being withdrawn from the opening.

In some embodiments, the hole is a blind hole.

In some embodiments, the hole has a rectangular circumferential shape when viewed in a direction facing the outward facing surface.

In some embodiments, the hole includes a hole inner surface having a first side, a second side that is parallel to and spaced apart from the first side, and a third side that joins the first side to the second side. The arm is a plate having a first surface that is surrounded by a peripheral edge. The arm first surface abuts the hole third side when the first housing portion is connected to the second housing portion, a first portion of the arm peripheral edge abuts the hole first side when the first housing portion is connected to the second housing portion, and a second portion of the arm peripheral edge abuts the hole second side when the first housing portion is connected to the second housing portion.

In some embodiments, the arm is a plate that is coplanar with a plane, and the hook protrudes from an edge of the arm so as to extend outward from the plane.

In some embodiments, the hole has an inner surface that is perpendicular to the outward facing surface of the second housing portion, the elastic member is a plate that is coplanar with a plane, and the plane is angled relative to the inner surface.

In some embodiments, the hole inner surface includes a hole sidewall and a hole endwall, the elastic member includes the first edge portion and a second edge portion that is opposed to the first edge portion, the second edge portion is joined to the hole sidewall at a location corresponding to an intersection of the hole with the outward facing surface of the second housing portion, and the elastic member first edge portion is spaced apart from the hole sidewall and the hole endwall.

In some embodiments, the hook comprises an inward facing surface that faces a blind end of the hole and an outward facing surface that faces the first housing portion, and the elastic member is a plate that has a second edge portion that is joined to a sidewall of the hole and the first edge portion that is opposed to the second edge portion, the first edge portion oriented so as to face the hook outward facing surface.

In some embodiments, the first edge portion is engaged with the hook outward facing surface in such a way as to retain latch within the hole.

In some aspects, a housing assembly includes a first housing portion and a second housing portion that is securable to the first housing portion via a fastener. The fastener includes a latch that that protrudes from one end of the first housing portion, the latch including an arm and a hook disposed on an end of the arm. The fastener includes a hole that is formed in an outward facing surface of the second housing portion, and the fastener includes an elastic member that is disposed in the hole so as to at least partially obstruct the hole. When the second housing portion is secured to the first housing portion, the latch is disposed in the hole and the hook foul's a snap-fit engagement with a first edge portion of the elastic member in such a way that the arm is prevented from being withdrawn from the hole.

In some embodiments, the hole is a blind hole.

In some embodiments, the hole has a rectangular circumferential shape.

In some embodiments, the hole includes a hole inner surface having a first side, a second side that is parallel to and spaced apart from the first side, and a third side that joins the first side to the second side. In addition, the arm is a plate having a first surface that is surrounded by a peripheral edge, and the arm first surface abuts the hole third side when the first housing portion is connected to the second housing portion. A first portion of the arm peripheral edge abuts the hole first side when the first housing portion is connected to the second housing portion, and a second portion of the arm peripheral edge abuts the hole second side when the first housing portion is connected to the second housing portion.

In some embodiments, the arm is a plate that is coplanar with a plane, and the hook protrudes from an edge of the arm so as to extend outward from the plane.

In some embodiments, the the hole has an inner surface that is perpendicular to the outward facing surface of the second housing portion, the elastic member is a plate that is coplanar with a plane, and the plane is angled relative to the inner surface.

In some embodiments, the hole inner surface includes a hole sidewall and a hole endwall, the elastic member includes the first edge portion and a second edge portion that is opposed to the first edge portion, the second edge portion is joined to the hole sidewall at a location corresponding to an intersection of the hole with the outward facing surface of the second housing portion, and the elastic member first edge portion is spaced apart from the hole sidewall and the hole endwall.

In some embodiments, the hook comprises an inward facing surface that faces a blind end of the hole and an outward facing surface that faces the first housing portion, and the elastic member is a plate that has a second edge portion that is joined to a sidewall of the hole and the first edge portion that is opposed to the second edge portion, the first edge portion oriented so as to face the hook outward facing surface.

In some embodiments, the first edge portion is engaged with the hook outward facing surface in such a way as to retain latch within the hole.

In some embodiments, the fastener is a first fastener, the housing assembly comprises a second fastener that has the same structure as the first fastener, and the second fastener is oriented relative to the first and second housing portions so as to be a mirror image of the first fastener.

In some aspects, an actuator such as those used to adjust seat position within a vehicle includes an electric motor and a gear set that connects the drive motor to the vehicle seat and transmits the output of the motor to the vehicle seat. The drive motor and gear set are each disposed in an individual, dedicated housing component. The individual housing components are then assembled together to provide a housing assembly that houses the actuator. The housing components are maintained in the assembled configuration using snap fit mechanical fasteners. Use of snap-fit mechanical fasteners can be advantageous since the snap fit fastener components may be formed integrally with the corresponding housing components in an injection molding process. In addition, fewer parts are included in the assembly and housing assembly is simple and can be performed without tools.

In some aspects, the snap-fit fastener includes a receiving portion provided on one housing component (for example, the drive motor housing) and a retaining portion provided on the other housing component (for example, the gear housing). The receiving portion may be a blind hole formed in the drive motor housing that is partially obstructed by an elastic member, while the retaining component is a latch that protrudes from an outer surface of the gear housing. In use, the latch is inserted into the blind hole, engages the elastic member and form a snap-fit engagement with the elastic member. Advantageously, since the receiving portion comprises a rectangular hole having a shape and dimensions that partially reflect the shape and dimensions of the latch, the hole provides structural support for the latch including absorption of loads applied to the latch. As a result, the snap-fit fastener is strong, durable and reliable.

DETAILED DESCRIPTION

Figure 1:
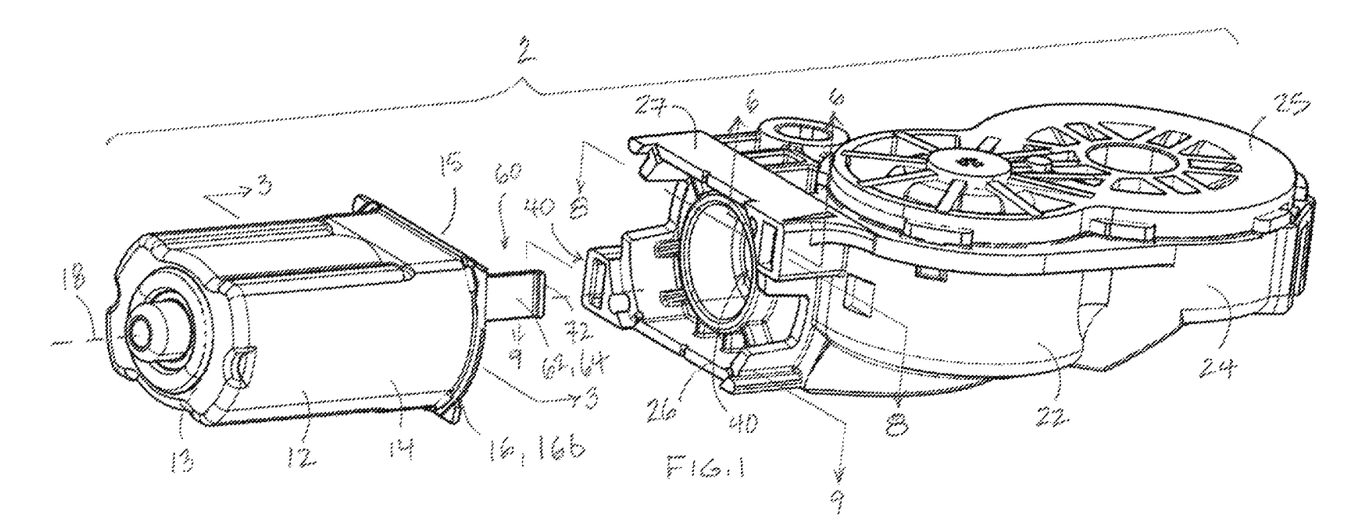
FIG. 1 is an exploded perspective view of an actuator having an actuator housing that includes a gear housing and a drive motor housing that are connected via a snap-fit fastener.
Figure 2:
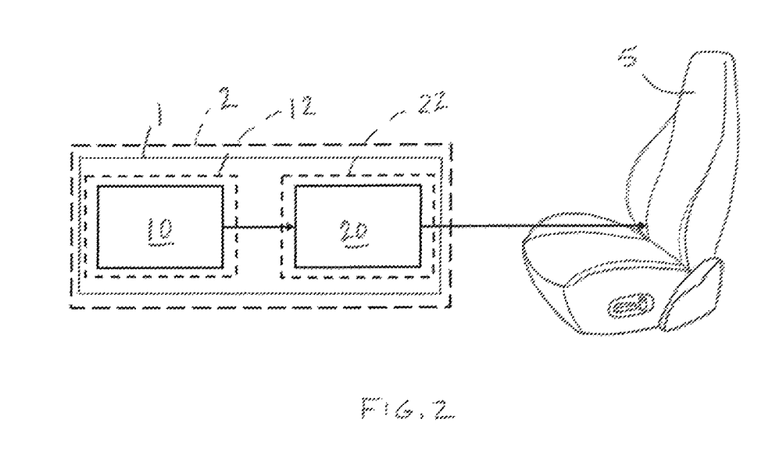
FIG. 2 is a schematic illustration of the actuator of FIG. 1 as configured to actuate a vehicle seat.

Referring to FIGS. 1 and 2, an actuator 1 such as those used to adjust the position of a vehicle seat 5 may include an electric drive motor 10, and a gear set 20 that is disposed between the drive motor 10 and vehicle seat 5. The gear set 20 transmits the output of the drive motor 10 to the vehicle seat 5. The drive motor 10 and the gear set 20 are housed in an actuator housing 2. The actuator housing 2 includes a gear housing 22 that receives the gear set 20 and supports the gear set 20 for rotation. The actuator housing 2 also includes a drive motor housing 12 that is formed separately from the gear housing 22, and is attached thereto during assembly of the actuator 1. The drive motor housing 12 is joined to the gear housing 22 at one end thereof using snap fit mechanical fasteners 30, as discussed in detail below.

In the illustrated embodiment, the actuator housing 2 includes two snap fit mechanical fasteners 30, e.g., a first fastener 30(1) and a second fastener 30(2). The first and second fasteners are structurally identical, so only one fastener 30 will be described. The fastener 30 includes the receiving portion 40, and the retaining portion 60 that forms a snap-fit engagement with the receiving portion 40. In the illustrated embodiment, the receiving portion 40 is provided on the gear housing 22, and the retaining portion 60 is provided on the drive motor housing 12, but the fastener 30 is not limited to this configuration. For example, in other embodiments, the receiving portion 40 is provided on the drive motor housing 12, and the retaining portion 60 is provided on the gear housing 22.

Figure 3:
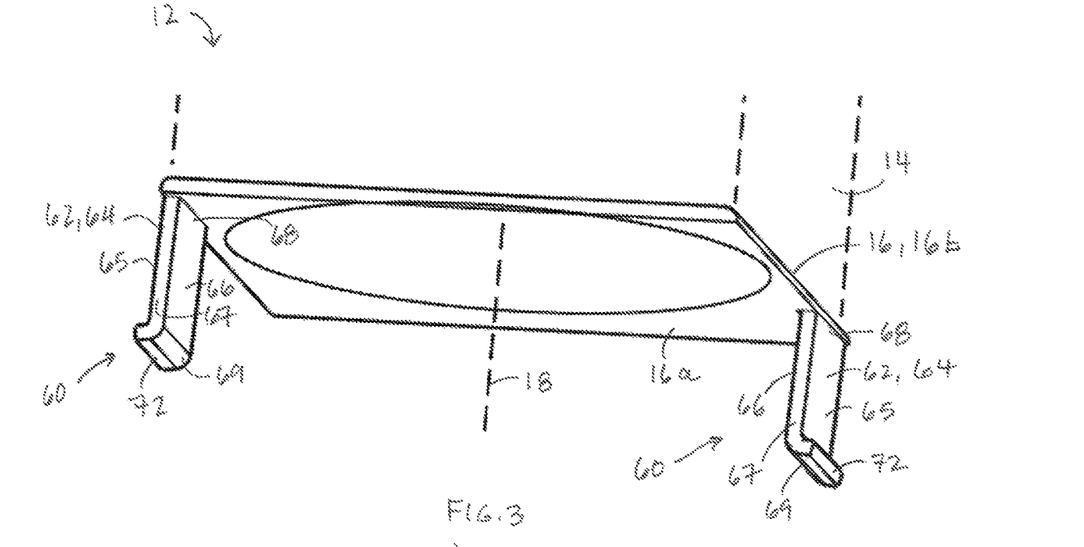
FIG. 3 is perspective view of a portion of the drive motor housing of FIG. 1.
Figure 4:
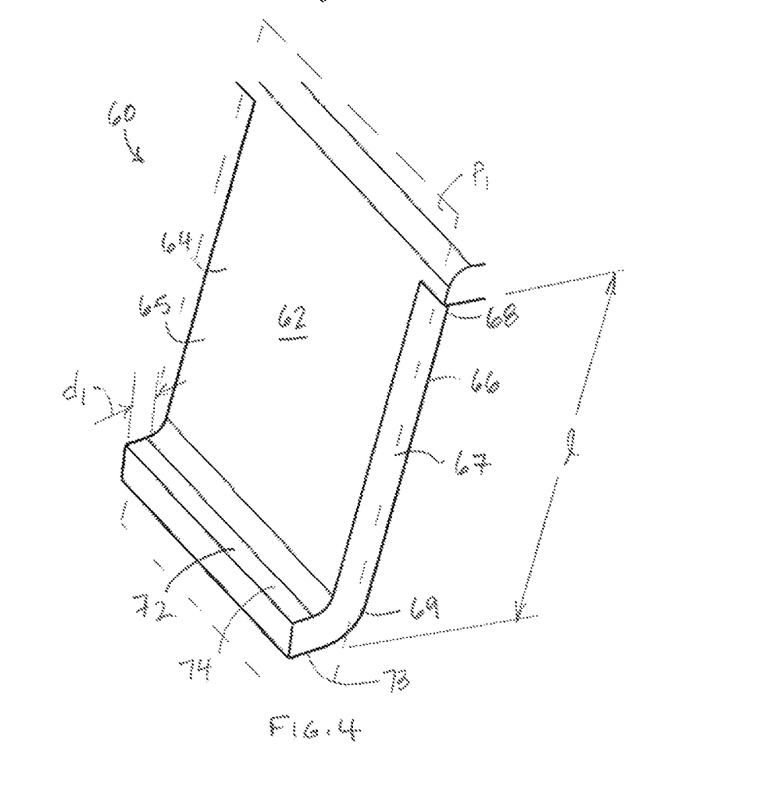
FIG. 4 is perspective view of a portion of the snap-fit fastener of FIG. 1.
Figure 5:
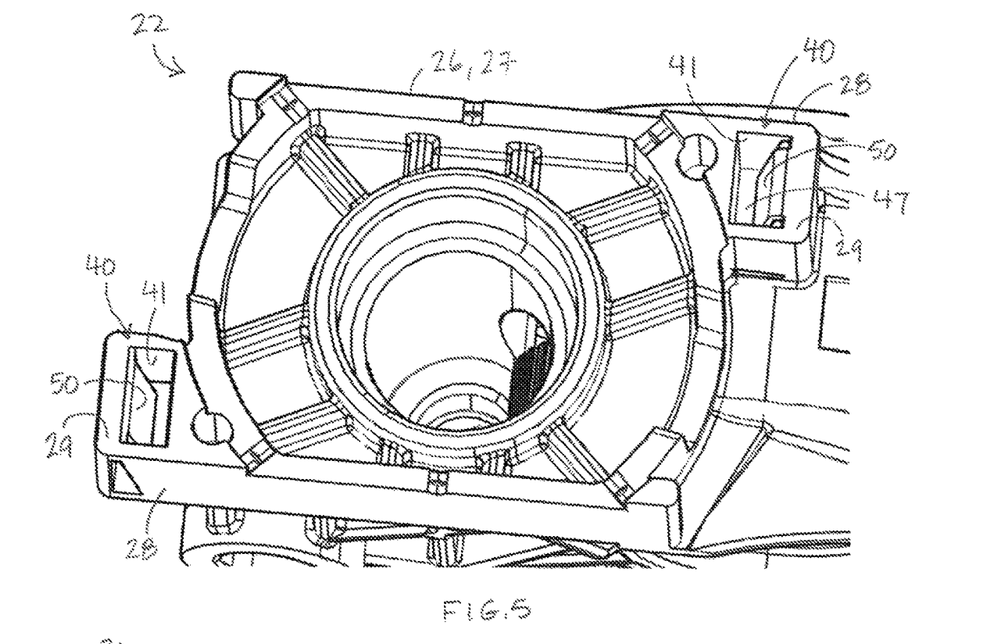
FIG. 5 is perspective view of a portion of the gear housing of FIG. 1.

Referring also to FIGS. 3 and 4, the drive motor housing 12 is a cup-like enclosure that includes a sidewall 14 having a closed end 13 and an open end 15. The sidewall 14 surrounds a longitudinal axis 18 of the drive motor housing 12 and the longitudinal axis 18 extends between the sidewall open and closed ends 13, 15. The sidewall open end 15 is opposed to the closed end 13, and is surrounded by a flange 16. The flange 16 protrudes outwardly from an outer surface of the sidewall 14 in a direction perpendicular to the longitudinal axis 18. The flange 16 has a first side 16a that faces the gear housing 22 and a second side 16b that is opposed to the first side 16a. The flange 16 includes a pair of retaining portions 60 that are provided on diametrically opposed sides of the sidewall open end 15.

The retaining portion 60 provides a part of a fastener 30, and includes a rigid latch 62 that protrudes from the flange first side 16a in a direction parallel to the longitudinal axis 18. The latch 62 includes an arm 64 and a hook 72 that is provided at one end of the arm 64. The arm 64 is a plate of uniform thickness and having a first surface 65, a second surface 66 that is opposed to the first surface 65, and a peripheral edge 67 that extends between the first and second surfaces 65, 66. The peripheral edge 67 includes a first edge portion 68 that is fixed to, or formed integrally with, the flange 16 and a second edge portion 69 that is opposed to the first edge portion 68, The hook 72 protrudes from the second edge portion 69 out of the plane P1 defined by the arm 64. In particular, the hook 72 protrudes in a direction that is perpendicular to the arm first and second surfaces 65, 66 and that is away from the longitudinal axis 18. The dimension dl of the hook 72 in a direction perpendicular to the arm first surface is much smaller than the length l of the latch 62 (FIG. 4), where the length l of the latch 62 is the distance between the latch first and second edge portions 68, 69. For example, in the illustrated embodiment, the dimension dl of the hook 72 is about 1/12 of the length f of the latch 62. The hook 72 includes an inward-facing surface 73 that faces the hole blind end 47 and an outward-facing surface that faces the drive motor housing 12. The hook outward facing surface 74 provides an engagement surface that engages with a portion of the receiving portion 40, as discussed further below.

Referring to FIGS. 1 and 5-7, the gear housing 22 includes a container 24 that receives the gear set 20, and a cover 25 that closes an open end of the container 24. The gear housing 22 also includes a fixture 26 that is provided at one end of the container 24 and that is configured to enable the gear housing 22 to form a secure and stable connection with the drive motor housing 12. The fixture 26 defines a wall portion 27 that protrudes outward from an outer surface 23 of the container 24 and has a profile or shape that is similar to that of the drive motor housing sidewall 14. The fixture wall portion 27 include a pair of rectangular bosses 28 that are formed on diametrically opposed sides of the fixture wall portion 27. The bosses 28 are positioned so as to be in alignment with the latches 62 of the drive motor housing flange 16 upon assembly of the drive motor housing 12 with the gear housing 22. The receiving portion 40 of the fastener 30 is formed in the boss 28.

The receiving portion 40 includes a blind hole 41 that is formed in an outward-facing surface of the gear housing 22, and an elastic member 50 that is disposed in the hole 41 in such a way as to at least partially obstruct the hole 41. In particular, the hole 41 is provided in an end face 29 of the boss 28 so as to open facing the drive motor housing 12. The hole 41 is rectangular in shape, and thus the hole inner surface 48 includes four sides: a first side 43; a second side 44 that adjoins the first side 43, and is slightly longer than and perpendicular to the first side 43; a third side 45 that adjoins the second side 44 and is parallel to and spaced apart from the first side 43; and a fourth side 46 that joins the third side 45 to the first side 43 and is parallel and spaced apart from the second side 44. The first, second, third and fourth sides 43, 44, 45, 46 are perpendicular to the boss end face 29. In addition, the hole 41 has a depth d (FIG. 6) that is greater than a length € (FIG. 4) of the latch 62, and terminates at a blind end 47.

Figure 6:
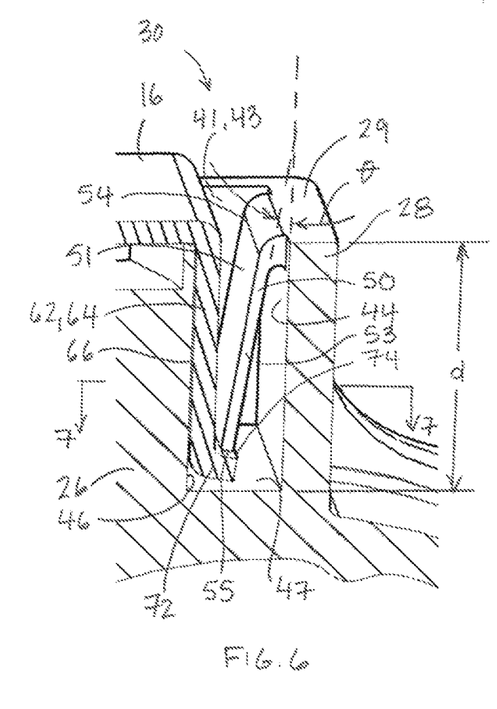
FIG. 6 is a cross-sectional view of the snap-fit fastener as seen along line 6-6 of FIG. 1.
Figure 7:
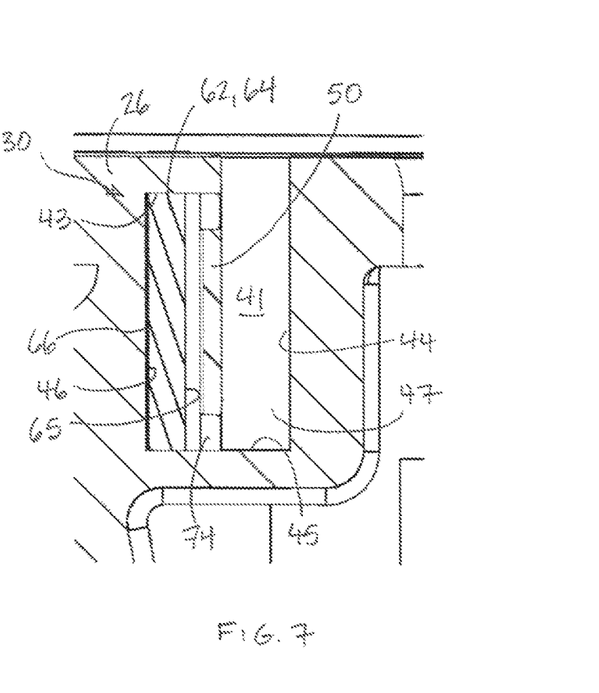
FIG. 7 is a cross-sectional view of the snap-fit fastener as seen along line 7-7 of FIG. 6.

The elastic member 50 is a plate of uniform thickness and having a first surface 51 that faces the hole fourth side 46, a second surface 52 that is opposed to the first surface 51 and thus faces the hole second side 44, and a peripheral edge 53 that extends between the first and second surfaces 51, 52. The elastic member peripheral edge 53 includes a first edge portion 54 and a second edge portion 55 that is opposed to, and spaced apart from, the first edge portion 54. The first edge portion 54 is fixed to, or is formed integrally with, the hole second side 44 at a location corresponding to the intersection of the hole 41 with the boss end face 29. The elastic member 50 is cantilevered from the hole second side 44 such that the elastic member 50 overlies the hole second side 44 and is angled relative to the hole second side 44 by an angle θ (FIG. 6). As a result, the elastic member 50 is spaced apart from the hole second side 44. In addition, the second edge portion 55 is spaced apart from the hole blind end 47. The second edge portion 55 provides an engagement edge that engages with the hook 72 to retain the latch within the receiving portion 40 as discussed further below. The elastic member 50 is sufficiently elastic to be deflected toward the hole second side 44 upon an application of a sufficient force to the first surface 51, and to elastically return to an expanded configuration in which the elastic member 50 is at an angle θ relative to the hole second side 44 (e.g., the configuration prior to application of force) upon removal of the applied force.

During assembly of the gear housing 22 with the drive motor housing 12, the latch 62 of the retaining portion 60 is inserted into the hole 41 of the receiving portion 40. Since the elastic member 50 is angled relative to the hole second surface 44 and thus partially obstructs the hole 41, as the latch 62 advances through the hole 41, the latch hook 72 contacts the elastic member 50 and urges the elastic member 50 to deflect toward the hole second side 44. The deflection of the elastic member 50 allows the latch 62, including the hook 72, to extend into the hole 41.

When the gear housing 22 is fully assembled with the drive motor housing 12, the latch 62 extends into the hole 41 to an extent that elastic member second edge portion 55 faces the hook outward-facing surface 74, and the hook 72 is disposed between the second edge portion 55 of the elastic member and the hole blind end 47. In this position, the outer surface of the drive motor housing 12 (e.g., the flange 16) abuts the end faces 29 of the bosses 28. In addition, the elastic member 50 elastically returns to an expanded configuration in which the elastic member second edge portion 55 urges the latch arm 64 against the hole fourth side 46. Moreover, the retaining portion 60 is retained in connection with the receiving portion 40 via engagement of the elastic member second edge portion 55 with the hook outward-facing surface 74, which prevents withdrawal of the latch 62 from the hole 41.

In the illustrated embodiment, latch arm 64 is dimensioned so that portions of the arm peripheral edge 67 abut the hole first and third sides 43, 45. In addition, the arm second surface 66 abuts the hole fourth side 46. By dimensioning the latch arm 64 to abut three sides (e.g., the first, third and fourth sides 43, 45, 46) of the hole 41, the latch arm 64 is supported by the hole inner surface 48 and likelihood of deflection of the latch arm 64 is minimized.

Figure 8:
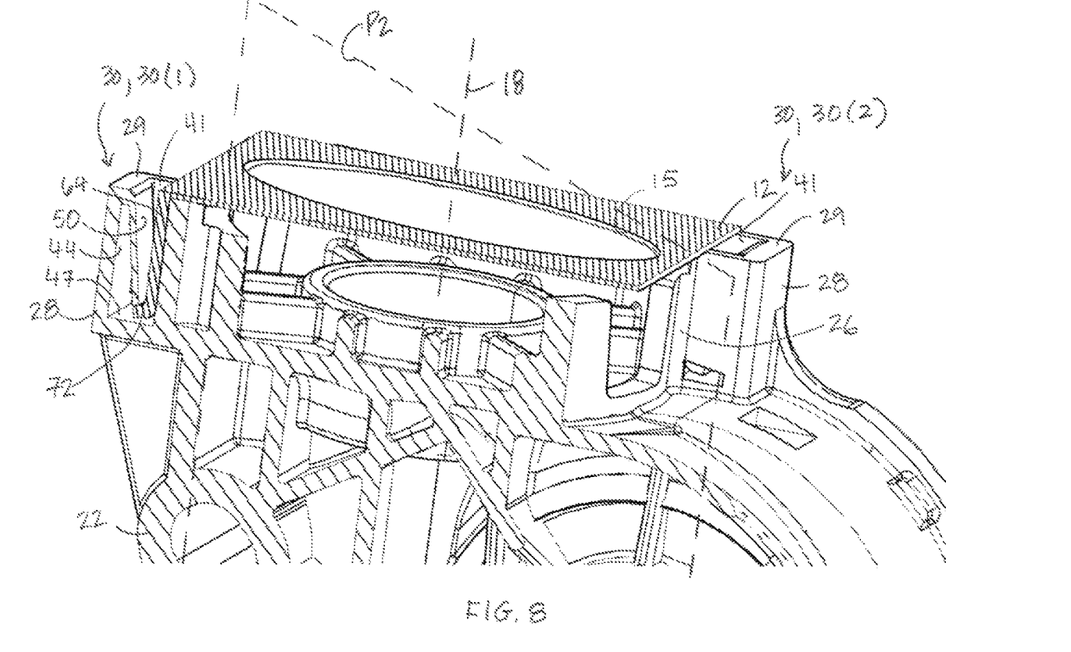
FIG. 8 is a cross-sectional view of the fixture including the snap-fit fastener as seen along line 8-8 of FIG. 1.
Figure 9:
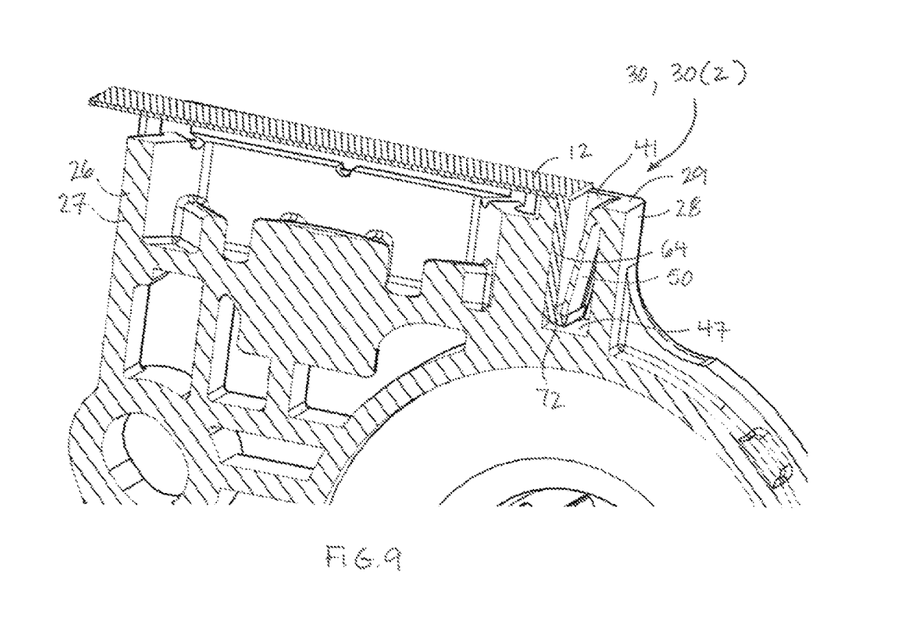
FIG. 9 is a cross-sectional view of the fixture including the snap-fit fastener as seen along line 9-9 of FIG. 1.

Referring to FIGS. 8 and 9, the actuator housing 2 includes the first fastener 30(1) that is disposed on one side of the actuator housing 2, and a second fastener 30(2) on a side of the actuator housing 2 that is opposed to the first fastener 30(1). In the illustrated embodiment, the fasteners 30(1) and 30(2) are located on diametrically opposed sides of the actuator housing 2 at the location at which the drive motor housing 12 is connected to the fixture 26. In addition, the fasteners 30(1) and 30(2) are oriented so that the first fastener 30(1) is a mirror image of (e.g., has reflectional symmetry with) the second fastener 30(2) relative to a plane P2 that includes the motor housing longitudinal axis 18. As a result, in each fastener 30(1), 30(2), the hole second side 44 is positioned outward relative to the hole fourth side 46, the latch hook 72 protrudes outward toward the hole second side 44, and the elastic member 50 is angled to extend inward toward the hole fourth sides 46. Because the first and second fasteners 30(1), 30(2) are mirrored, the contact between the latch anus 64 and the hole fourth sides 46 will absorb radial forces and each latch arm 64 will experience minimal or no bending, whereby the first and second fasteners 30(1), 30(2) are made strong, durable and reliable.

In the illustrated embodiment, the actuator housing 2 includes two snap-fit fasteners 30(1) and 30(2). It is understood, however, that a greater or fewer number of fasteners 30 can be used to join housing components together, and the number of snap-fit fasteners 30 used is determined by the requirements of the specific application.

Selective illustrative embodiments of the housing and fasteners are described above in some detail. It should be understood that only structures considered necessary for clarifying the housing and fasteners have been described herein. Other conventional structures, and those of ancillary and auxiliary components of the housing and fasteners, are assumed to be known and understood by those skilled in the art. Moreover, while a working example of the housing and fasteners have been described above, the housing and fasteners are not limited to the working examples described above, but various design alterations may be carried out without departing from the housing and fasteners as set forth in the claims.

We claim:

1. A fastener configured to join a first housing portion to a second housing portion, the fastener comprising a receiving portion and a retaining portion that is received in, and engages with, the receiving portion, wherein
the retaining portion includes a latch that protrudes from one-of one of the first housing portion and the second housing portion, the latch including an arm and a hook disposed on an end of the arm,
the other of the first housing portion and the second housing portion includes:
an outward facing surface, the outward facing surface having a hole formed therein; and
an elastic member disposed in the hole so as to at least partially obstruct the hole, the receiving portion comprising the hole and the elastic member, and
when the first housing portion is assembled with the second housing portion, the latch is disposed in the opening and the hook forms a snap-fit engagement with a first edge portion of the elastic member in such a way that the arm is prevented from being withdrawn from the opening,
the hook comprises an inward facing surface that faces a blind end of the hole and an outward facing surface that faces the first housing portion, and
the elastic member is a plate that has a second edge portion that is joined to a sidewall of the hole and the first edge portion that is opposed to the second edge portion, the first edge portion oriented so as to face the hook outward facing surface.

2. The fastener of claim 1, wherein the hole is a blind hole.

3. The fastener of claim 1, wherein the hole has a rectangular circumferential shape when viewed in a direction facing the outward facing, surface.

4. The fastener of claim 1, wherein
the hole includes a hole inner surface having a first side, a second side that is parallel to and spaced apart from the first side, and a third side that joins the first side to the second side, and
the arm is a plate having a first surface that is surrounded by a peripheral edge,
the arm first surface abuts the hole third side when the first housing portion is connected to the second housing portion,
a first portion of the arm peripheral edge abuts the hole first side when the first housing portion is connected to the second housing portion, and
a second portion of the arm peripheral edge abuts the hole second side when the first housing portion is connected to the second housing portion.

5. The fastener of claim 1, wherein the arm is a plate that is coplanar with a plane, and the hook protrudes from an edge of the arm so as to extend outward from the plane.

6. The fastener of claim 1, wherein
the hole has an inner surface that is perpendicular to the outward facing surface of the second housing portion,
the elastic member is a plate that is coplanar with a plane, and
the plane is angled relative to the inner surface.

7. The fastener of claim 6, wherein
the hole inner surface includes a hole sidewall and the hole blind end,
the elastic member includes the first edge portion and a second edge portion that is opposed to the first edge portion,
the second edge portion is joined to the hole sidewall at a location corresponding to an intersection of the hole with the outward facing surface of the second housing portion, and
the elastic member first edge portion is spaced apart from the hole sidewall and the hole blind end.

8. The fastener of claim 1, wherein the first edge portion is engaged, with the hook outward facing surface in such a way as to retain latch within the hole.

9. A housing assembly comprising a first housing portion and a second housing portion that is securable to the first housing portion via a fastener, wherein
the fastener comprises
a latch that that protrudes from one end of the first housing portion, the latch including an arm and a hook disposed on an end of the ann,
a hole that is formed in rd facing surface of the second housing portion, and
an elastic member that is disposed in the hole so as to at least partially obstruct the hole, and
when the second housing portion is secured to the first housing portion, the latch is disposed in the hole and the hook forms a snap-fit engagement with a first edge portion of the elastic member in such a way that the arm is prevented from being withdrawn from the hole,
the hook comprises an inward facing surface that faces a blind end of the hole and air outward facing surface that faces the first housing portion, and
the elastic member is a plate that has a second edge portion that is joined to a sidewall of the hole and the first edge portion that is opposed to the second edge portion, the first edge portion oriented so as to face the hook outward facing surface.

10. The housing assembly of claim 9, wherein the hole is a blind hole.

11. The housing assembly of claim 9, wherein the hole has a rectangular circumferential shape.

12. The housing assembly of claim 9, wherein
the hole includes a hole inner surface having a first side, a second side that is parallel to and spaced apart from the first side, and a third side that joins the first side to the second side, and
the arm is a plate having a first surface that is surrounded by a peripheral edge,
the arm first surface abuts the hole third side when the first housing portion is connected to the second housing portion,
a first portion of the arm peripheral edge abuts the hole first side when the first lousing portion is connected to the second housing portion, and a second portion of the arm peripheral edge abuts the hole second side when the first housing portion is connected to the second housing portion.

13. The housing assembly of claim 9, wherein the arm is a plate that is coplanar with a plane, and the hook protrudes from an edge of the arm so as to extend outward from the plane.

14. The housing assembly of claim 9, wherein
the hole has an inner surface that is perpendicular to the outward facing surface of the second housing portion,
the elastic member is a plate that is coplanar with a plane, and
the plane is angled relative to the inner surface.

15. The housing assembly of claim 14, wherein
the hole inner surface includes a hole sidewall and the hole blind end,
the elastic member includes the first edge portion and a second edge portion that is opposed to the first edge portion,
the second edge portion is joined to the hole sidewall at a location corresponding to an intersection of the hole with the outward facing surface of the second housing portion, and
the elastic member first edge portion is spaced apart from the hole sidewall and the hole blind end.

16. The housing assembly of claim 9, wherein the first edge portion is engaged with the hook outward facing surface in such a way as to retain latch within the hole.

17. The housing assembly of claim 9, wherein
the fastener is a first fastener,
the housing assembly comprises a second fastener that has the same structure as the first fastener, and
the second fastener is oriented relative to the first and second housing portions so as to be a mirror image of the first fastener.

* * * * *

UNITED STATES PATENT AND TRADEMARK OFFICE
CERTIFICATE OF CORRECTION

PATENT NO. : 10,784,743 B2  
APPLICATION NO. : 16/103249  
DATED : September 22, 2020  
INVENTOR(S) : Ortiz et al.

Page 1 of 1

It is certified that error appears in the above-identified patent and that said Letters Patent is hereby corrected as shown below:

In the Claims

In Claim 3, at Column 7, Line 51: "the outward facing, surface" should read --the outward facing surface--.

In Claim 8, at Column 8, Line 24: "is engaged, with" should read --is engaged with--.

In Claim 9, at Column 6, Line 32: "disposed on an end of the ann," should read --disposed on an end of the arm--.

In Claim 9, at Column 6, Lines 41-42: "formed in rd facing surface" should read --formed in an outward facing surface--.

Signed and Sealed this  
Nineteenth Day of January, 2021

Andrei Iancu  
*Director of the United States Patent and Trademark Office*